US011150453B2

(12) United States Patent
Dyba

(10) Patent No.: US 11,150,453 B2
(45) Date of Patent: Oct. 19, 2021

(54) SCANNING DEVICE FOR SCANNING AN OBJECT FOR USE IN A SCANNING MICROSCOPE

(71) Applicant: LEICA MICROSYSTEMS CMS GMBH, Wetzlar (DE)

(72) Inventor: Marcus Dyba, Heidelberg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 430 days.

(21) Appl. No.: 16/064,475

(22) PCT Filed: Dec. 23, 2016

(86) PCT No.: PCT/EP2016/082517
§ 371 (c)(1),
(2) Date: Nov. 14, 2018

(87) PCT Pub. No.: WO2017/109155
PCT Pub. Date: Jun. 29, 2017

(65) Prior Publication Data
US 2019/0064494 A1 Feb. 28, 2019

(30) Foreign Application Priority Data
Dec. 23, 2015 (LU) .......................................... 92924

(51) Int. Cl.
*G02B 21/00* (2006.01)
*G02B 26/08* (2006.01)
(Continued)

(52) U.S. Cl.
CPC ..... *G02B 21/0048* (2013.01); *G02B 26/0833* (2013.01); *G02B 26/101* (2013.01); *G02B 27/642* (2013.01)

(58) Field of Classification Search
None
See application file for complete search history.

(56) References Cited

U.S. PATENT DOCUMENTS

| 5,096,279 A | 3/1992 | Hornbeck et al. |
| 6,072,625 A | 6/2000 | Kitahara et al. |

(Continued)

FOREIGN PATENT DOCUMENTS

| DE | 102008054317 A1 | 5/2010 |
| DE | 102012019464 A1 | 4/2014 |

(Continued)

OTHER PUBLICATIONS

Larry J. Hornbeck, "Deformable-Mirror Spatial Light Modulators", Proceedings of SPIE, 33$^{rd}$ Annual Technical Symposium, May 22, 1990, pp. 1-20.

(Continued)

*Primary Examiner* — Jennifer D. Carruth
(74) *Attorney, Agent, or Firm* — Leydig, Voit & Mayer, Ltd.

(57) ABSTRACT

A scanning device for scanning an object in a scanning microscope includes at least one scanning unit configured to two-dimensionally scan the object using a light beam. The scanning unit includes at least one deflection element configured to deflect a light beam impinging thereon. The deflection element is rotationally symmetric in shape. At least one rotation device is configured to rotate the scanning unit about an axis of rotation so as to allow for image field rotation.

17 Claims, 5 Drawing Sheets

(51) Int. Cl.
*G02B 26/10* (2006.01)
*G02B 27/64* (2006.01)

(56) References Cited

U.S. PATENT DOCUMENTS

| | | | |
|---|---|---|---|
| 6,738,189 B1 | 5/2004 | Ulrich et al. | |
| 6,937,784 B1* | 8/2005 | Stevens | G02B 6/3518 385/17 |
| 7,982,934 B2* | 7/2011 | Champion | H04N 9/3185 359/200.8 |
| 8,545,027 B2* | 10/2013 | Wakabayashi | G03B 21/14 353/88 |
| 8,547,627 B2* | 10/2013 | Jain | B81B 3/0021 359/290 |
| 2008/0143196 A1 | 6/2008 | Sprague et al. | |
| 2008/0303900 A1* | 12/2008 | Stowe | F16M 11/10 348/143 |
| 2009/0080049 A1 | 3/2009 | Ko et al. | |
| 2010/0182667 A1 | 7/2010 | Ishida | |
| 2011/0284767 A1 | 11/2011 | Wolleschensky et al. | |
| 2012/0212790 A1* | 8/2012 | Fehrer | G02B 21/0048 359/198.1 |
| 2012/0330157 A1 | 12/2012 | Mandella et al. | |
| 2013/0033732 A1* | 2/2013 | Davis | H04N 9/3173 359/198.1 |
| 2013/0140447 A1* | 6/2013 | Kim | A61B 6/035 250/234 |
| 2013/0163060 A1* | 6/2013 | Li | G02B 26/10 359/200.8 |
| 2014/0355093 A1* | 12/2014 | Goepel | H02N 2/123 359/221.2 |
| 2015/0253556 A1 | 9/2015 | Schwedt et al. | |
| 2015/0378149 A1* | 12/2015 | Imaizumi | G02B 26/0816 359/221.2 |
| 2017/0108693 A1* | 4/2017 | Straub | G02B 26/085 |
| 2018/0120156 A1* | 5/2018 | Suzuki | G01D 5/266 |
| 2020/0049974 A1* | 2/2020 | Sugimoto | G01J 3/45 |

FOREIGN PATENT DOCUMENTS

| | | |
|---|---|---|
| EP | 0950206 B1 | 10/1999 |
| EP | 1719012 B1 | 11/2006 |
| JP | H 09164331 A | 6/1997 |
| JP | H10-260359 A | 9/1998 |
| JP | 2005156756 A | 6/2005 |
| JP | 2009075587 A | 4/2009 |
| JP | 2011100073 A | 5/2011 |
| JP | 2012507756 A | 3/2012 |
| JP | 2012237789 A | 12/2012 |

OTHER PUBLICATIONS

Hyun-Joon Shin, et al., "Fiber-optic confocal microscope using a MEMS scanner and miniature objective lens", Optics Express, vol. 15, No. 15, Jul. 23, 2007, pp. 1-10.

Veljko Milanovic, et al., "Gimbal-Less Monolithic Silicon Actuators for Tim-Tilt-Piston Micromirror Applications", IEEE Journal of Selected Topics in Quantum Electronics, vol. 10, No. 3, May/Jun. 2004, pp. 462-471.

Veljko Milanovic, et al., "Highly Adaptable MEMS-Based Display with Wide Projection Angle", 2007 IEEE 20th International Conference on Micro Electro Mechanical Systems (MEMS), Jan. 21-25, 2007, pp. 1-4.

Veljko Milanovic, et al., ""MEMSEye" for Optical 3D Position and Orientation Measurement", SPIE Photonics West Conference, Jan. 2011, pp. 1-6.

"Mirrorcle Technologies MEMS Mirrors—Technical Overview", Dec. 2009, pp. 1-7.

Veljko Milanovic, "Multilevel Beam Soi-Mems Fabrication and Applications", Journal of Microelectromechanical Systems, vol. 13, No. 1, Feb. 2004, pp. 19-30.

William L. Wolfe, "Nondispersive PRISMS[1,2]", Optical Elements, Dec. 2010, pp. 1-29.

Hyejun Ra, et al., "Two-Dimensional Mems Scanner for Dual-Axes Confocal Microscopy", Journal of Microelectromechanical Systems, vol. 16, No. 4, Aug. 2007, pp. 969-976.

Swift, D.W., "Image rotation devices—a comparative survey," Optics and Laser Technology, Aug. 1972, pp. 175-188, Elsevier, Netherlands.

* cited by examiner

SCANNING DEVICE FOR SCANNING AN OBJECT FOR USE IN A SCANNING MICROSCOPE

CROSS-REFERENCE TO PRIOR APPLICATIONS

This application is a U.S. National Stage Application under 35 U.S.C. § 371 of International Application No. PCT/EP2016/082517 filed on Dec. 23, 2016, and claims benefit to Luxembourgian Patent Application No. LU 92924 filed on Dec. 23, 2015. The International Application was published in German on Jun. 29, 2017 as WO 2017/109155 A1 under PCT Article 21(2).

FIELD

The invention relates to a scanning device for scanning an object for use in a scanning microscope. The invention further relates to a scanning microscope comprising a scanning device arranged in the beam path of the scanning microscope.

BACKGROUND

Opto-mechanical scanners in the form of microelectromechanical systems (MEMS scanners) are known in the prior art and are used in laser scanning microscopes, in particular confocal laser scanning microscopes.

US 2008/0143196 A1 and EP 1 719 012 B1 for example disclose MEMS scanners which tilt a micromechanical mirror about two mutually perpendicular axes of rotation (2D scanner). MEMS scanners of this kind are also known for example from the company Mirrorcle Technologies, Inc.

The technology is also described in the documents V. Milanović, "Multilevel-Beam SOI-MEMS Fabrication and Applications," IEEE/ASME Journal of Microelectromechanical Systems, vol. 13, no. 1, pages 19-30, February 2004; V. Milanović, D. T. McCormick, G. Matus, "Gimballess Monolithic Silicon Actuators For Tip-Tilt-Piston Micromirror Applications," IEEE J. of Select Topics in Quantum Electronics, Volume: 10, Issue: 3, May-June 2004, pages 462-471; Veljko Milanovic, N. Siu, A. Kasturi, M. Radojicic, Y. Su, "MEMSEye for Optical 3D Position and Orientation Measurement," Proceedings of SPIE Photonics West 2011, Volume: 7930-27[4]; and Veljko Milanovic, Kenneth Castelino, Daniel McCormick, "Highly Adaptable MEMS-based Display with Wide Projection Angle," 2007 IEEE Int Cont. on Microelectromechanical Systems (MEMS'07), Kobe, Japan, Jan. 25, 2007.

In particular, in this case the two axes of rotation intersect in the center of the micromechanical mirror such that the center of rotation of a deflected light beam is located exactly in the center of the mirror. This "gimbaled mounting" is widespread in optics. The known 2D MEMS scanners are suitable in particular for scanning microscopes since they make it possible for the laser beam that is to be scanned to be deflected in two preferably perpendicular directions. In order to generate a 2D image, the laser beam can be deflected using just one MEMS scanner, which is cost-effective and technically advantageous. In contrast, when using MEMS scanners comprising just one tilt axis, at least two scanners are required for the 2D deflection. Using scanners of this kind in miniaturized, confocal scanning microscopes is also known, for example from US 2012/0330157 A1 and the documents Hyun-Joon Shin, et al., in Optics Express, 2007, Vol. 15, pages 9113 ff, "Fiber-optic confocal microscope using MEMS scanner", and Hyejun Ra et al., Journal of Microelectromechanical Systems, 2007, Vol. 16, pages 969 ff, "Two-Dimensional MEMS Scanner for Dual-Axes Confocal Microscopy".

FIG. 4 is a schematic view to illustrate a reflection of a laser beam on a 2D scanner 12' according to the prior art. As shown in FIG. 4, the 2D scanner 12' is part of a scanner device 10'. FIG. 4 also shows that the 2D scanner 12' comprises a scanning mirror 18'. The scanning mirror 18' is tilted about one or more axes using the scanner 12', as is known for example from US 2008/0143196 A1. In this case, the scanner 12' must expediently be arranged such that the angle of reflection ao' produced between the incoming laser beam 110' and the reflected laser beam 112' in a home position of the scanner is always greater than the maximum optical scanning angle as' of the scanner 12' (see FIG. 4). In particular, the maximum optical scanning angle as' corresponds to an angle of rotation relative to the reflected laser beam 112' in the home position of the scanner that is formed between the reflected laser beam 114' in an operating position of the scanner and the reflected laser beam 112' in the home position of the scanner. In order to keep the technical implementation as simple as possible, angles of reflection ao' of greater than or equal to 45°, often 90°, are generally used in this case. Further micromechanical scanners, known as "deformable mirror devices" (DMD) are known for example from the document Larry J. Hornbeck, "Deformable-Mirror Spatial Light Modulators", Proceedings of SPIE, The International Society for Optical Engineering, Volume 1150, San Diego, US, 6-11 Aug. 1989, and from U.S. Pat. No. 5,096,279 A.

In order to achieve as small as possible a size of the scanning mirror 18', the scanning mirror 18' of the known MEMS scanner 12' according to FIG. 4 is usually elliptical in shape. The projected mirror surface towards the incoming and emergent laser beam 110', 112' is thus circular. This is advantageous in that the two major axes 32', 34' of the ellipse shown in FIG. 4 can be selected so as to be as small as possible in order to still be able to completely capture the laser beam that is to be scanned. This miniaturization in particular allows for optical structures that are as small as possible, and at the same time maximum scanning speeds since the moments of inertia of the scanning mirror 18' can be kept to a minimum. When the known MEMS scanner 12' is arranged at an angle of 45° to the incoming laser beam 110', in which arrangement the scanning mirror 18' produces an angle of reflection ao of 90° in the home position of the scanner, it is typically necessary to use a ratio of the mirror semi-axes 32' to 34' of $1/\cos(45°)=\sqrt{2}$.

Furthermore, an optical image field rotator is known from the prior art, such as is used in high-quality laser scanning microscopes. An optical image field rotator is described in EP 0 950 206 B1 for example. This known image field rotator is an optical module that comprises a rotatable Abbe or Dove prism. The operating principle of said prisms is known to a person skilled in the art and is explained for example in the document William L. Wolfe: Chapter 4. Nondispersive Prisms. In: Michael Bass (Ed.): Handbook of optics, vol. 2: Devices, Measurements, and Properties. 2nd edition, McGraw-Hill, New York 1995, ISBN 0-07-047740-X.

Using image field rotation is important in scanning microscopes in order for it to be possible to ideally adjust the position of the scanning field to the sample structure in question in the case of rectangular image formats having very different edge lengths (i.e. a scanning field that is as small as possible and that is adjusted to the sample structure in question). This allows for small scanning fields that ensure image acquisition that protects the sample and is above all quick, since irrelevant regions do not need to be scanned. An example of use is an individual cell filament, for example a tubulin or actin filament that extends diagonally through the sample. The advantage when using an optical image field rotator is that the sample itself does not need to be moved, which increases the stability of the microscope. This in particular prevents the sample needing to be rotated about an arbitrarily selected axis, i.e. about the current image field center.

SUMMARY

In an embodiment, the present invention provides a scanning device for scanning an object in a scanning microscope. The scanning device includes at least one scanning unit configured to two-dimensionally scan the object using a light beam. The scanning unit includes at least one deflection element configured to deflect a light beam impinging thereon. The deflection element is rotationally symmetric in shape. At least one rotation device is configured to rotate the scanning unit about an axis of rotation so as to allow for image field rotation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 is a schematic drawing to illustrate a reflection of a light beam on the scanning device according to FIG. 1a.

DETAILED DESCRIPTION

Figure 1A:
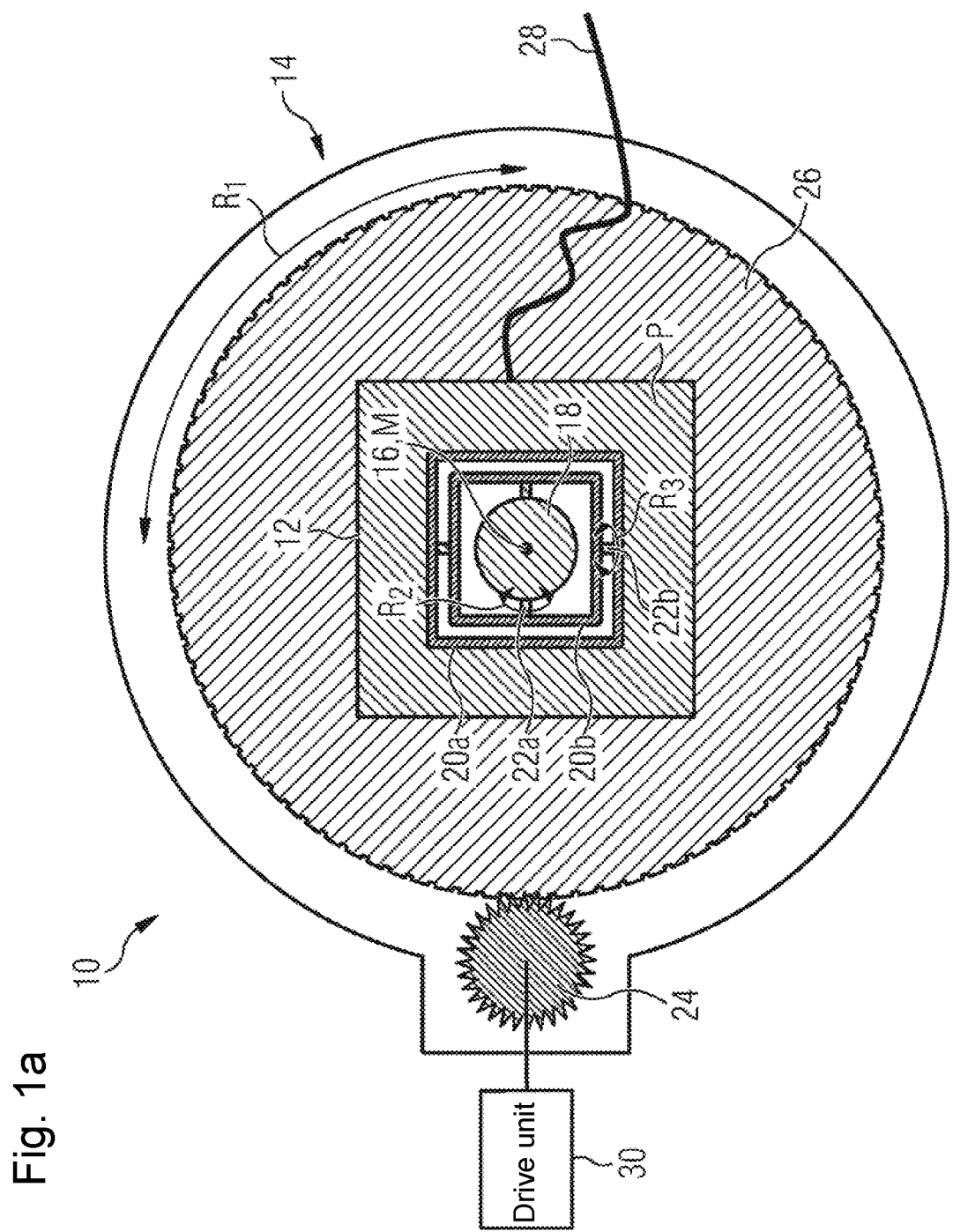
FIG. 1a is a schematic view of a scanning device comprising a scanning unit in a first rotational position, according an embodiment.

The known image field rotators are disadvantageous in that they are comparatively large. They are therefore unsuitable in particular for use in miniaturized scanning microscopes that use MEMS technologies. Furthermore, the known image field rotators are disadvantageous in that they have a relatively complex structure and lead to high costs. A further disadvantage of the known image field rotators is that the polarization characteristics of the laser beam are not maintained, although this is important for some applications.

In an embodiment, the invention provides a scanning device for scanning an object for use in a scanning microscope, which device allows for an optimized beam path for the scanning beam for scanning the object and simultaneously allows for image field rotation.

A scanning device according to an embodiment of the invention allows for an optimized beam path for a scanning beam for scanning the object, and simultaneously allows for image field rotation because at least one scanning unit and at least one rotation device are provided. The scanning unit is intended for two-dimensional scanning of the object using a light beam. The rotation device rotates the scanning unit about an axis of rotation in order to allow for image field rotation. In this case, the scanning unit comprises at least one deflection element for deflecting a light beam impinging on the deflection element. Furthermore, the deflection element is rotationally symmetrical in shape. The rotationally symmetrical shape is preferably a circle. The rotationally symmetrical shape of the deflection element makes it possible to provide a preferred direction or a specified deflection angle of the scanning beam which is comparatively small but also larger than a maximum scanning angle. This results in a beam path for the scanning beam that is optimized in terms of the dimensions thereof. This makes it possible in particular to use the scanning device in miniaturized scanning microscopes. At the same time, advantageous image field rotation can be produced by rotating the scanning unit about the axis of rotation. An optimized beam path for a scanning beam for scanning the object, and simultaneously image field rotation, can thus be achieved.

The axis of rotation about which the scanning unit is rotatable advantageously extends perpendicularly to a plane in which the scanning unit extends. The scanning unit can thus be rotated in a plane thereof.

The deflection element is preferably pivotable about a first swivel pin and/or about a second swivel pin in accordance with a maximum scanning angle. In this case, the first swivel pin and the second swivel pin extend in parallel with a plane in which the scanning unit extends. A scanning beam for two-dimensional scanning of the object can thus be provided.

The first swivel pin and the second swivel pin preferably each extend through a center of the deflection element. It is thus possible to achieved gimbaled mounting of the deflection element.

The rotationally symmetrical shape preferably relates to a center of the deflection element. In this case, the axis of rotation about which the scanning unit is rotatable extends through said center of the deflection element. It is thus possible to ensure that defined image field rotation is produced in every rotational position of the scanning unit.

The scanning unit is preferably rotatable about the axis of rotation at least in an angle range of from 0° to 180°. When the scanning unit is rotated in this angle range, the swivel pins can be moved into any desired rotational position between a horizontal rotational position and a vertical rotational position in order to achieve complete scanning of the object.

The deflection element is preferably a reflective element for reflecting an impinging light beam. In this case, the deflection element is designed to reflect the impinging light beam in a manner that retains the polarization. It is thus possible to prevent an undesired polarization characteristic of the reflected light beam, in particular of a laser beam.

The scanning unit preferably comprises a MEMS (microelectromechanical systems) scanner or a DMD (deformable mirror device) scanner. It is thus possible to provide a scanning unit (i.e. scanner) that is suitable for use in miniaturized scanning microscopes.

The MEMS scanner is preferably a monolithic 2D scanner. Two-dimensional scanning of the object can thus be achieved using a single MEMS scanner.

The rotation device preferably comprises a gear assembly that can be driven using a drive unit. In this case, the gear assembly is designed to rotate the scanning unit about the axis of rotation. It is thus possible to provide a reliable drive for rotating the scanning unit about the axis of rotation.

Another embodiment of the invention provides a scanning microscope comprising a scanning device according to an embodiment of the invention arranged in the beam path of the scanning microscope. In particular a miniaturized scanning microscope is achieved using the scanning device according to this embodiment of the invention. The scanning microscope is for example a laser scanning microscope, preferably a confocal laser scanning microscope.

The scanning unit is preferably arranged such that the light beam impinging on the deflection element is deflected, in a home position of the scanning unit, such that the deflected light beam and the impinging light beam form a specified deflection angle. In this case, the specified deflection angle is greater than a maximum scanning angle for two-dimensional scanning of the object, and is less than 45°. It is thus possible to achieve a beam path for the scanning beam for scanning the object that is optimized, i.e. minimized, in comparison with the prior art.

The specified deflection angle is preferably less than or equal to 35°, less than or equal to 30°, less than or equal to 25°, less than or equal to 20°, less than or equal to 15° or less than or equal to 10°. It is thus possible to provide the preferred direction or the specified deflection angle of the scanning beam in different angle ranges.

The maximum scanning angle is preferably ±25°, ±20°, ±15°, ±10° or ±5°. It is thus possible to specify different maximum scanning angles for the two-dimensional scanning of the object.

The scanning microscope preferably comprises an image capture unit for capturing a digital image of the scanned object, and an image processing unit for processing the digital image. The digital image can for example be mirrored and rotated in the memory of a computer (PC) using the image processing unit, in order to depict every desired image position in a display unit.

FIG. 1a is a schematic view of a scanning device 10 comprising a scanning unit 12 in a first rotational position, according to an embodiment. The scanning device 10 according to FIG. 1a is used for scanning an object 122 for use in a scanning microscope 100, as is shown by way of example in FIG. 2. As shown in FIG. 1a, the scanning device 10 comprises the scanning unit 12, which is arranged on a rotation device 14. The scanning unit 12 is intended for two-dimensional scanning of the object 122 using a light beam. The rotation device 14 rotates the scanning unit 12 about an axis of rotation 16 in order to allow for image field rotation. FIG. 1a further shows that the scanning unit 12 comprises a deflection element 18 that is rotationally symmetrical in shape. The deflection element 18 deflects a light beam impinging on the deflection element 18. FIG. 1a in particular shows a first rotational position of the scanning unit 12. Said first rotational position corresponds to an angle of rotation of 0° for example. A rotation of the scanning unit 12 about the axis of rotation 16 is shown schematically in FIG. 1a by the double arrow $R_1$.

In the embodiment in FIG. 1a, the deflection element 18 is circular.

According to FIG. 1, the rotation device 14 comprises a drive unit 30 by means of which a gear assembly can be driven. The gear assembly comprises a first gear 24 and a second gear 26. The first gear 24 can be driven using the drive unit 30. The second gear 26 is connected to the scanning unit 12 and is meshed with the first gear 24 such that, when the first gear 24 is driven, the scanning unit 12 connected to the second gear 26 is rotated about the axis of rotation 16.

In the embodiment in FIG. 1a, the axis of rotation 16 extends perpendicularly to a plane P in which the scanning unit 12 extends. Furthermore, the axis of rotation 16 extends through a center M of the deflection element 18. In this case, said center M corresponds to a center of the circular shape of the deflection element 18.

As shown in FIG. 1a, the deflection element 18 is pivotable about a first swivel pin 22A and about a second swivel pin 22B. By means of said swivel pins 22A, 22B, the deflection element 18 can in each case be pivoted in accordance with a maximum scanning angle as, as shown by way of example in FIG. 3. FIG. 1a further shows that the two swivel pins 22A, 22B extend in parallel with a plane P in which the scanning unit 12 extends. Pivoting of the deflection element 18 about the relevant swivel pin 22A, 22B is shown schematically in FIG. 1a by the double arrows $R_2$ and $R_3$, respectively.

According to FIG. 1a, the scanning unit 12 comprises a first frame 20A and a second frame 20B. The first frame 20A surrounds the second frame 20B. The second frame 20B is connected to the first frame 20A and is mounted thereon so as to be rotatable about the second swivel pin 22B. The deflection element 18 is connected to the second frame 20B and is mounted thereon so as to be rotatable about the first swivel pin 22A. The scanning unit 12 thus in particular comprises a gimballed mounting for mounting the deflection element 18. In said gimballed mounting, the two swivel pins 22A, 22B each extend through the center M of the deflection element 18.

In the embodiment shown in FIG. 1a, the deflection element 18 is a reflective element for reflecting a light beam impinging thereon. The deflection element 18 is in particular used for reflecting the impinging light beam (e.g. a laser beam) in a manner that maintains the polarization. The deflection element 18 is preferably a mirror comprising a circular mirror surface.

As shown in FIG. 1a, the scanning unit 12 is connected to a cable 28 for signal transmission.

Figure 1B:
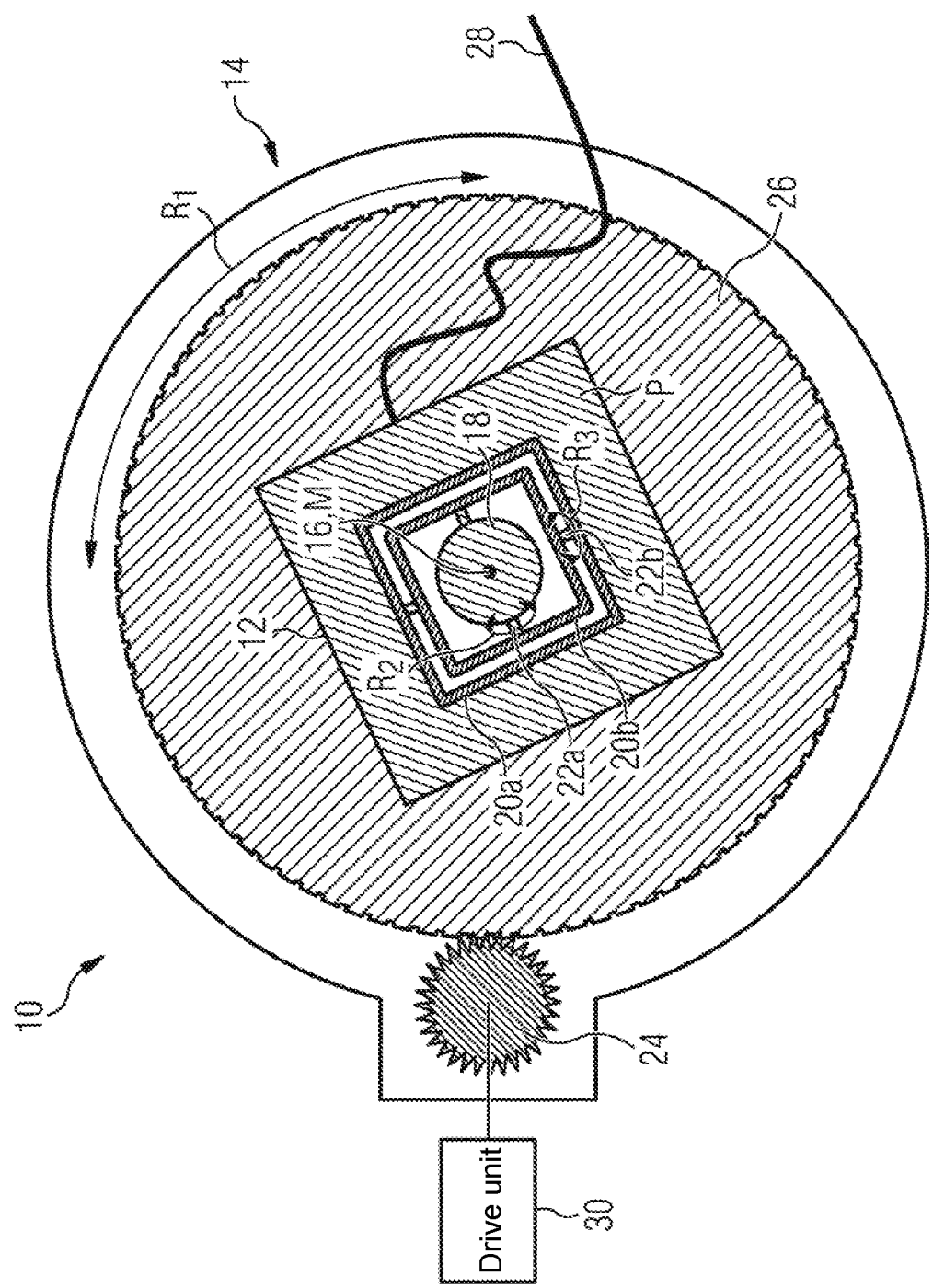
FIG. 1b is a schematic view of the scanning device according to FIG. 1a comprising the scanning unit in a second rotational position.

FIG. 1b is a schematic view of the scanning device 10 according to FIG. 1a comprising the scanning unit 12 in a second rotational position. Said second rotational position corresponds to an angle of rotation within an angle range of from 0° to 180° for example. Furthermore, the rotation device 14 can also rotate the scanning unit 12 about larger angles of rotation, for example of greater than or equal to 180° or greater than or equal to 360°. In particular, the rotation should not be impeded by the cable 28 that is connected to the scanning unit 12.

In particular the rotational positions of the scanning unit 12 shown in FIGS. 1a and 1b can be maintained using the rotation device 14. In this case, said rotational positions are associated with different settings for the image field rotation in each case.

Figure 2:
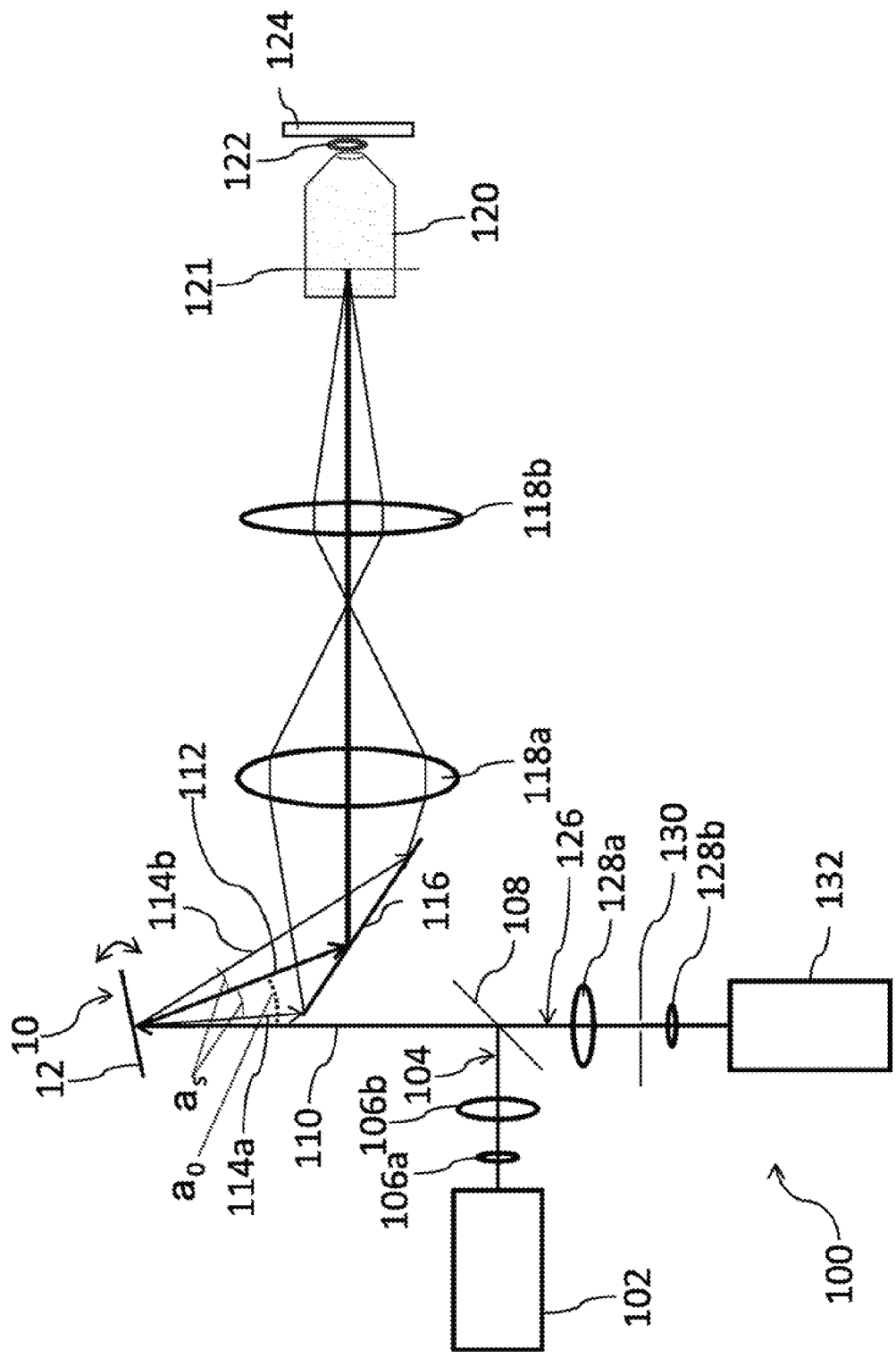
FIG. 2 is a schematic side view of a scanning microscope comprising the scanning device according to FIG. 1a in accordance with an embodiment.

FIG. 2 is a schematic side view of a scanning microscope 100 comprising the scanning device 10 according to FIG. 1a in accordance with an embodiment. The scanning microscope 100 shown in FIG. 2 is in particular a confocal laser scanning microscope. As shown in FIG. 2, the scanning device 10 is arranged in the beam path of the scanning microscope 100. The scanning microscope 100 comprises a laser light source 102 that generates a scanning beam 104 for scanning the object 122. The object 122 is arranged on a microscope stage 124. A beam splitter 108 is arranged between the scanning device 10 and the laser light source 102. Furthermore, lenses 106a, 106b are arranged between the beam splitter 108 and the laser light source 102, through which lenses the scanning beam 104 extends. A mirror 116 is arranged behind the scanning device 10 in the direction of the scanning beam 104, which mirror reflects the scanning beam 104 towards an objective 120 that is arranged above the microscope stage 124. Imaging optics are arranged between the objective 120 and the mirror 116, which optics are formed by lenses 118a, 118b. The scanning beam 104 is imaged on a focal plane 121 of the objective 120 using said imaging optics. The detection beam 126 (e.g. fluorescent radiation) that emanates from the scanned object 122 and extends substantially in the opposite direction from the scanning beam 104 is detected using a detector 132. Detection optics are arranged behind the beam splitter 108 in the direction of the detection beam 126, which optics are formed by lenses 128a, 128b and an aperture diaphragm 130. Said detection optics are used for imaging the object 122 on the detector 132.

As shown in FIG. 2, the scanning beam 104 comprises a first beam portion 110 that is before the scanning device 10 in the direction of the scanning beam 104, and a second beam portion 112 (or 114a, 114b) that is after the scanning device 10 in the direction of the scanning beam 104. In this case, the first beam portion 110 corresponds to a light beam impinging on the deflection element 18 of the scanning unit 12, while the second beam portion 112 or 114a, 114b corresponds to a light beam deflected by the deflection element 18 of the scanning unit 12. FIG. 2 in particular schematically shows the two-dimensional scanning of the object 122 that is carried out using the scanning unit 12. In this case, the beam portion 112 corresponds to a light beam that is deflected in a home position of the scanning unit 12, while the beam portions 114a, 114b each correspond to a light beam that is deflected in an operating position of the scanning unit 12. The beam portion 112 furthermore has a preferred direction that is defined by a specified deflection angle $\alpha_0$ (i.e. the angle between the beam portions 110, 112), while the beam portions 114a, 114b each have a direction that is defined by a maximum scanning angle $\alpha_s$. For example, the maximum scanning angle corresponds to a positive or negative angle of rotation relative to the beam portion 112 having the preferred direction. Further details regarding the angles $\alpha_0$ and as will be described in the following with reference to FIG. 3.

Figure 3:
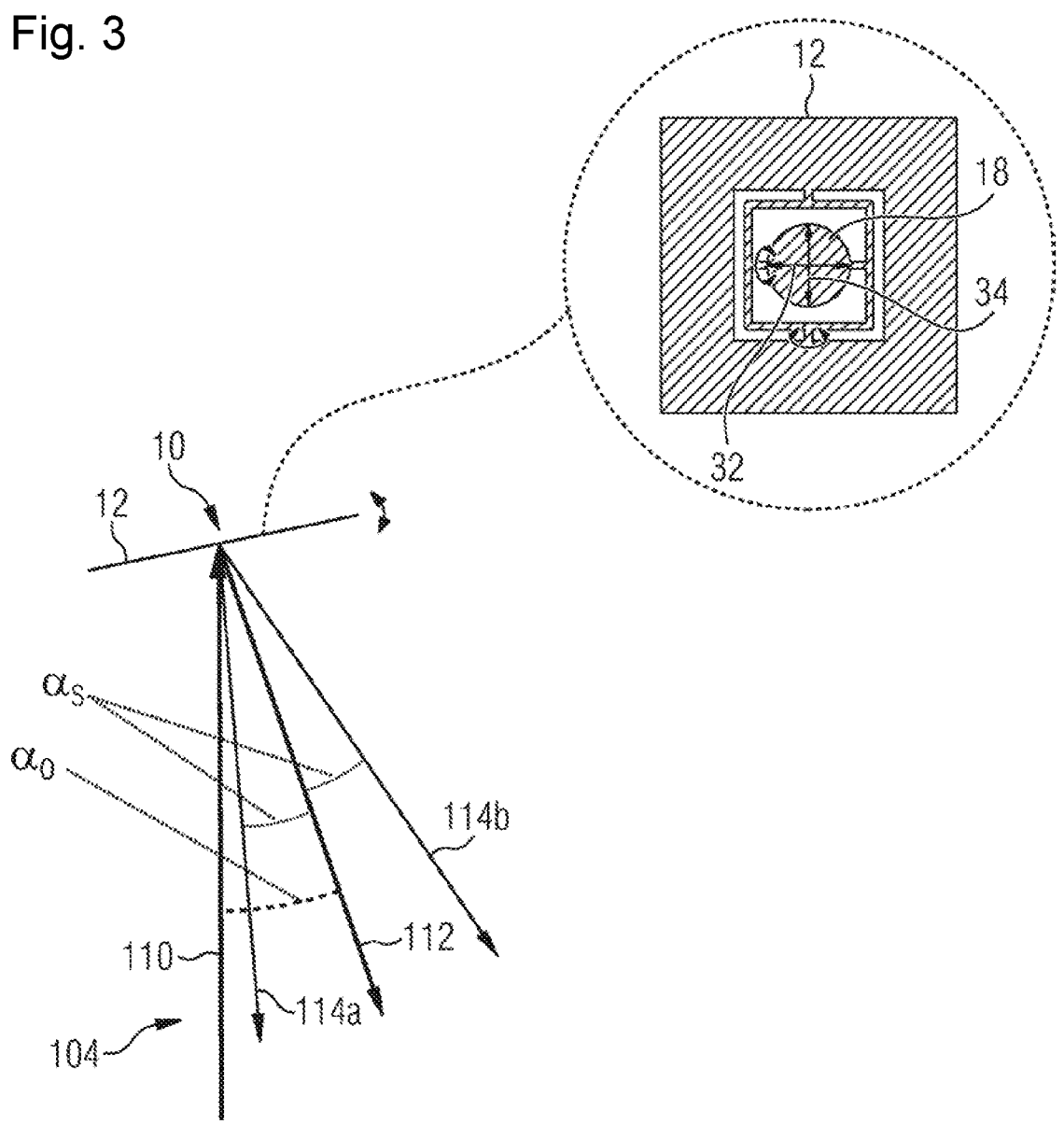

FIG. 3 is a schematic drawing to illustrate a reflection of a light beam 104 on the scanning device 10 according to FIG. 1a. According to FIG. 3, the scanning unit 12 is arranged such that the beam portion 110 is deflected, in a home position of the scanning unit 12, such that the beam portions 110, 112 form a specified deflection angle (i.e. $\alpha_0$). In this case, said specified deflection angle $\alpha_0$ is in particular greater than a maximum scanning angle (i.e. $\alpha_s$) and is preferably less than 45°. The comparatively small deflection angle $\alpha_0$ can be achieved using the rotationally symmetrical deflection element 18. In the event of the deflection element 18 being circular, the two semi-axes 32, 34 of the corresponding circle are of the same size.

For example, the specified deflection angle $\alpha_0$ is less than or equal to 30°, preferably less than or equal to 25°, when the maximum scanning angle $\alpha_s=\pm 20°$.

For example, the specified deflection angle $\alpha_0$ is less than or equal to 15° when the maximum scanning angle $\alpha_s=\pm 10°$.

As an alternative to the embodiment shown in FIG. 1a, the scanning device for example comprises a first scanning unit for one-dimensional scanning of the object, a second scanning unit for one-dimensional scanning of the object, a first rotation device for rotating the first scanning unit, and a second rotation device for rotating the second scanning unit. In this case, the first rotation device and the second rotation device are designed to rotate the first scanning unit and the second scanning unit such that the rotational movements thereof are synchronized.

Embodiments of the invention provide a purely optical, cost-effective image field rotator in a miniaturized optical design of a laser scanning microscope 100 using a 2D scanner 12. In contrast to an image field rotator known from the prior art, the image field rotator according to the invention can be miniaturized and does not require a complex beam path. The polarization of the incoming laser beam 104 is preferably maintained using the image field rotator according to the invention.

Figure 4:
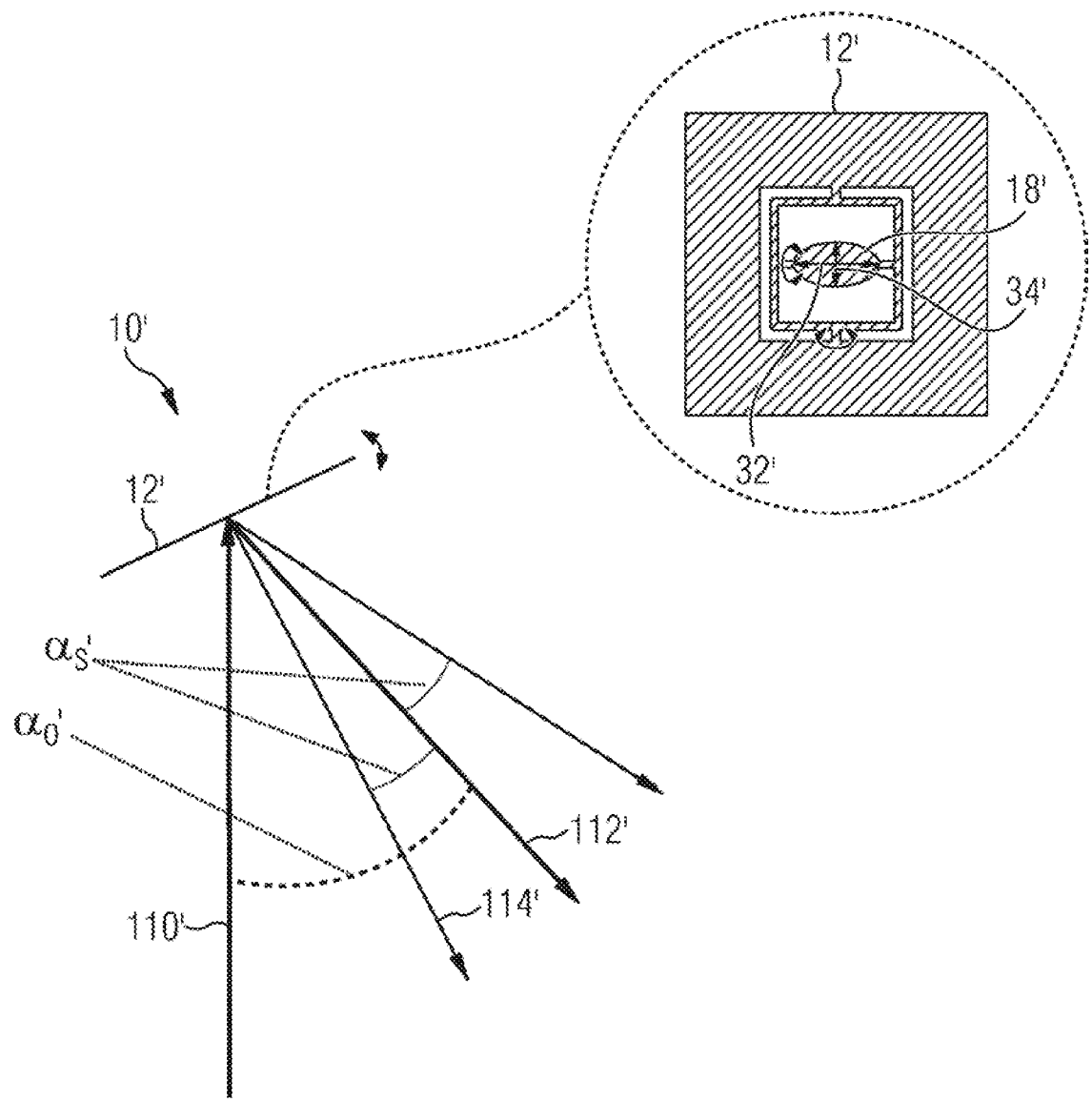
FIG. 4 is a schematic view to illustrate a reflection of a laser beam on a 2D scanner according to the prior art.

The invention in particular has the following advantages. It has been found that it is not necessary to select a comparatively large deflection angle $\alpha_0'$ according to FIG. 4. In contrast, the optical scanning angle $\alpha_s$ of the miniaturized 2D MEMS scanner 12 can be selected so as to be less than $\pm 20°$, preferably less than $\pm 10°$. When selecting an angle of reflection $\alpha_0$ in the home position of the scanner, which angle is just slightly greater than the maximum scanning angle $\alpha_s$, for example less than 25°, a ratio of the two semi-axes of the projected elliptical beam profile of the projected laser beam 104 on the mirror surface is only approximately 1:1. At an optimized, i.e. minimized, size, the semi-major axis 32' of the elliptical MEMS mirror 18' would have to be only approximately 10% larger than the semi-minor axis 34' (see FIG. 4). In this case, there is no significant disadvantage of using round, i.e. rotationally symmetrical, MEMS mirrors 18 having equal lengths 32, 34 (see FIG. 3). Mirrors of this kind are also known and widespread in the prior art. It is therefore possible to use round mirrors and to simultaneously keep the characteristic variables of the MEMS scanner (almost) ideal. Specifically, this means an (almost) minimized mirror size, minimized moments of inertia, and thus a maximized scanning frequency.

Similar also applies when selecting slightly larger deflection angles $\alpha_0$, for example of greater than 25°, and especially when selecting smaller deflection angles $\alpha_0$.

An embodiment of the invention makes use of a 2D scanner, preferably a miniaturized biaxial MEMS scanner 12. In contrast to conventional scanning modules which are based on galvanometer scanners for example, a main advantage when using the 2D scanner 12 is that both scanning axes 22a, 22b are united in one element and tilt the same mirror 18 by means of gimballed or almost gimballed mounting. Two separate scanning units, for example consisting of two separate galvanometer scanners for the x- and y-axis, are therefore no longer necessary.

It has furthermore been found that selecting a round scanning mirror 18 in the 2D MEMS scanner 12 and simultaneously selecting a small deflection angle $\alpha_0$ of for example less than 25° makes it possible to implement the optical image field rotator according to the invention without having complex optical elements in the beam path. This is shown in particular on the basis of FIG. 2.

According to embodiments, rotating the 2D scanner 12 about an axis of rotation 16 that is perpendicular to the mirror plane P and intersects said plane centrally results in image field rotation of the microscope structure, as is shown schematically in FIG. 2. A rotation about the axis of rotation 16, i.e. what is known as image field rotation, results in particular in an azimuthal position change of the scanning axes 22a, 22b in the mirror plane P. If, for example, the axis 22a is the quick scanning axis and is associated with the image coordinate X, said axis is rotated. In the microscope structure, said scanning direction of the laser beam 104 is rotated accordingly in the sample 122, while the sample 122 does not move.

It is particularly advantageous within the meaning of an ideal scanning movement and image field rotation when the axes 22a, 22b and 16 intersect in the center M of the mirror 18 (i.e. a gimballed mounted mirror having an intersection point of the axes 22a, 22b in the center M of the mirror). Instead of the gimballed mounting, it is also possible for the axes 22a, 22b to intersect not in the center M of the mirror. However, the axes 16 should intersect the mirror 18 in or close to the center M of the mirror 18 in order to ensure that the scanner 12 functions in all rotational positions.

For technical reasons, the image field rotation thus produced cannot make 360° rotations in the same direction as often as desired, since the cable 28 for signal transmission leads to the rotating scanner 12 and does not allow for any desired number of rotations. However, an image field rotation of from 0° to 180° or from −90° to +90° is entirely sufficient for achieving the desired effect. If desired, all further image orientations can then be produced in the digital representation (computer) by means of simple image processing, i.e. mirroring and rotating the digital image in the PC memory. All that is important is for each orientation of the scanning axes 22a, 22b to be achievable in the optomechanical design. This is already the case in a covered angle range of 180° in total.

It should be noted that implementation of the invention according to an embodiment does not require a MEMS scanner. Instead, all that is required is for the beam 104 to impinge fully on the mirror 18 at every image field rotation angle, i.e. for the projection of the beam 104 on the mirror 18 to always fully capture the mirror surface. This is achieved in particular by using comparatively small deflection angles $\alpha_0$ and round mirror shapes. Elliptical mirrors according to the prior art should not be used, since the rotational position is then no longer defined.

The unit used for scanning, i.e. the scanner 12, is preferably a monolithic 2D scanner that deflects a single mirror 18 in two preferably perpendicular scanning directions. If the two scanning directions are split over two different units, just one scanning direction being implemented in each unit, the invention likewise operates by means of a rotation device according to FIGS. 1a and 1b for each of said individual units. The different rotation devices should then rotate so as to be mutually synchronized.

According to embodiments, other beam deflection elements can also be used instead of mirrors. These may for example be elements integrated in MEMS technology, such as lenses, lens systems or prisms, which produce beam deflection by means of lateral displacement or tilting. It is also possible to use deformable mirror devices (DMD), as described for example in Larry J. Hornbeck, "Deformable-Mirror Spatial Light Modulators", Proceedings of SPIE, The International Society for Optical Engineering, Volume 1150, San Diego, US, 6-11 Aug. 1989, light modulators based on liquid crystals (spatial light modulator), or (2D) scanners based on acousto-optic scanning units (acousto optic deflectors, AOD) in combination with the image field rotator according to the invention. In said cases, the corresponding scanning unit should then be rotated in an entirely analogous manner. However, since these approaches are relatively costly and/or technically complex, the use of MEMS or DMD mirror scanners is of central importance in practical implementation, because the aim usually pursued is that of achieving a miniaturized scanner that also has miniaturized optical image field rotation without additional complex optical elements in the beam path.

Embodiments of the invention provide a 2D scanner that is installed in the scanning microscope at comparatively small deflection angles and can therefore be rotationally symmetrical (round). The use of round scanning mirrors is made possible according to the invention. This is associated with achieving small deflection angles $\alpha_0$ that are just slightly larger than the maximum optical scanning angle $\alpha_s$ of the scanner. According to embodiments, the entire scanning unit is rotated. In this case, the image field rotation is perpendicular to the mirror plane and intersects the center of the mirror. Furthermore, according to embodiments, the angle range of the image field rotation is limited by the cable lead, although this does not cause any functional restriction.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 scanning device
12 scanning unit
14 rotation device
16 axis of rotation
18 deflection element
20a, 20b frame
22a, 22b swivel pin
24, 26 gear
28 cable
30 drive unit
32, 34 semi-axes
100 scanning microscope
102 laser light source
104 scanning beam
106a, 106b, 118a,
118b, 128a, 128b lens
108 beam splitter 110, 112, 114a,
114b beam portion
116 mirror
120 objective
121 focal plane
122 object
124 microscope stage
126 detection beam
130 aperture diaphragm
132 detector
$\alpha_0$, $\alpha_s$ angles
M center
P plane
$R_1$ to $R_3$ direction
10' to 114', $\alpha_0'$, $\alpha_s'$ known components and angles

The invention claimed is:

1. A scanning device for scanning an object in a scanning microscope, the scanning device comprising:
at least one scanning unit configured to two-dimensionally scan an image plane of the object using a light beam by rotating about first and second axes that are perpendicular to each other, the scanning unit including at least one deflection element configured to deflect a light beam impinging thereon, the deflection element being rotationally symmetric in shape; and
at least one rotation device configured to rotate the scanning unit about a third axis of rotation that is perpendicular to the first and second axes so as to allow for rotation of the image plane.

2. The scanning device according to claim 1, wherein the third axis of rotation about which the scanning unit is rotatable extends perpendicularly to a plane in which the scanning unit extends.

3. The scanning device according to claim 1, wherein the deflection element is pivotable about a first swivel pin and/or about a second swivel pin in accordance with a maximum scanning angle, and wherein the first swivel pin and/or the second swivel pin extend in parallel with a plane in which the scanning unit extends.

4. The scanning device according to claim 1, further comprising a first swivel pin and a second swivel pin, each of the swivel pins extending through a center of the deflection element.

5. The scanning device according to claim 1, wherein the rotationally symmetrical shape relates to a center of the deflection element, and wherein the third axis of rotation about which the scanning unit is rotatable extends through the center of the deflection element.

6. The scanning device according to claim 1, wherein the scanning unit is rotatable about the third axis of rotation at least in an angle range of from 0° to 180°.

7. The scanning device according to claim 1, wherein the deflection element is a reflective element configured to reflect the light beam impinging thereon, and wherein the deflection element is configured to reflect the light beam impinging thereon in a manner that retains polarization.

8. The scanning device according to claim 1, wherein the scanning unit comprises a microelectromechanical systems (MEMS) scanner or a deformable mirror device (DMD) scanner.

9. The scanning device according to claim 8, wherein the MEMS scanner is a monolithic two-dimensional (2D) scanner.

10. The scanning device according to claim 1, wherein the rotation device comprises a gear assembly that is drivable by a drive unit so as to rotate the scanning unit about the axis of rotation.

11. A scanning microscope comprising the scanning device according to claim 1 arranged in a beam path of the scanning microscope.

12. The scanning microscope according to claim 11, wherein the scanning unit is arranged such that the light beam impinging on the deflection element is deflected, in a home position of the scanning unit, such that the deflected light beam and the impinging light beam form a specified deflection angle greater than a maximum scanning angle for the two-dimensional scanning of the object and less than 45°.

13. The scanning microscope according to claim 12, wherein the specified deflection angle is less than or equal to 35°.

14. The scanning microscope according to claim 11, wherein a maximum scanning angle is ±25°, ±20°, ±15°, ±10° or ±5°.

15. The scanning microscope according to claim 11, wherein the scanning microscope is a laser scanning microscope.

16. The scanning device according to claim 1, wherein the deflection element comprises a mirror and the third axis extends perpendicularly to a plane of the mirror.

17. The scanning device according to claim 16, wherein the first, second and third axes intersect a center of the mirror.

* * * * *